United States Patent
Aoyama et al.

(10) Patent No.: US 11,204,256 B2
(45) Date of Patent: Dec. 21, 2021

(54) COMMUNICATION TERMINAL, MOVEMENT GUIDANCE SYSTEM, AND NON-TRANSITORY COMPUTER-READABLE RECORDING MEDIUM STORING COMPUTER PROGRAM

(71) Applicant: TOYOTA JIDOSHA KABUSHIKI KAISHA, Toyota (JP)

(72) Inventors: Shingo Aoyama, Anjo (JP); Daisuke Tanizaki, Okazaki (JP); Kenji Nagase, Okazaki (JP); Motohiro Nakamura, Okazaki (JP); Kazunori Watanabe, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 630 days.

(21) Appl. No.: 15/836,194

(22) Filed: Dec. 8, 2017

(65) Prior Publication Data
US 2018/0164120 A1  Jun. 14, 2018

(30) Foreign Application Priority Data

Dec. 12, 2016  (JP) .............................. JP2016-240477

(51) Int. Cl.
*G01C 21/34* (2006.01)
*G01C 21/36* (2006.01)
(Continued)

(52) U.S. Cl.
CPC ......... *G01C 21/3694* (2013.01); *G01C 21/32* (2013.01); *G01C 21/34* (2013.01);
(Continued)

(58) Field of Classification Search
CPC .. G01C 21/32; G01C 21/34; G08G 1/096827; H04W 4/40; G06F 17/30241
(Continued)

(56) References Cited

U.S. PATENT DOCUMENTS 6,075,467 A    6/2000  Ninagawa
6,889,134 B2*  5/2005  Nakane .................. G01C 21/32
                                                    701/533

(Continued)

FOREIGN PATENT DOCUMENTS

JP    H11-065436 A    3/1999
JP    2003-065770 A   3/2003
(Continued)

OTHER PUBLICATIONS

United States Patent and Trademark Office, Non-Final Office Action issued to U.S. Appl. No. 16/080,533 dated Sep. 15, 2020, 36 pages.
(Continued)

*Primary Examiner* — Dalena Tran
(74) *Attorney, Agent, or Firm* — Hunton Andrews Kurth LLP

(57) ABSTRACT

Movement guidance information for performing traveling guidance for a vehicle is requested to a guidance information delivering server device based on an area update table and an area identification table for managing an update state of map information in a communication terminal, and traveling guidance for the vehicle is performed based on the movement guidance information delivered from the guidance information delivering server device in response to the request.

14 Claims, 8 Drawing Sheets

(51) Int. Cl.

| | | |
|---|---|---|
| *G01C 21/32* | (2006.01) | |
| *G08G 1/0969* | (2006.01) | |
| *G06F 16/29* | (2019.01) | |
| *G08G 1/0968* | (2006.01) | |
| *G08G 1/005* | (2006.01) | |
| *G09B 29/00* | (2006.01) | |

(52) U.S. Cl.
CPC ..... *G01C 21/3629* (2013.01); *G01C 21/3676* (2013.01); *G06F 16/29* (2019.01); *G08G 1/005* (2013.01); *G08G 1/0969* (2013.01); *G08G 1/096822* (2013.01); *G08G 1/096861* (2013.01); *G08G 1/096883* (2013.01); *G09B 29/003* (2013.01); *B60W 2556/50* (2020.02)

(58) Field of Classification Search
USPC .......................................... 701/532; 707/689
See application file for complete search history.

(56) References Cited

U.S. PATENT DOCUMENTS

| | | | | |
|---|---|---|---|---|
| 7,974,959 | B2 * | 7/2011 | Sawai | G01C 21/32 |
| | | | | 701/532 |
| 8,649,976 | B2 | 2/2014 | Kreft | |
| 9,285,238 | B2 | 3/2016 | Nogawa et al. | |
| 2002/0091485 | A1 * | 7/2002 | Mikuriya | G01C 21/32 |
| | | | | 701/450 |
| 2003/0045997 | A1 | 3/2003 | Nakane et al. | |
| 2004/0196163 | A1 | 10/2004 | Takenaga et al. | |
| 2006/0080029 | A1 | 4/2006 | Kodani et al. | |
| 2006/0173614 | A1 | 8/2006 | Nomura | |
| 2007/0213929 | A1 | 9/2007 | Tanizaki et al. | |
| 2011/0106431 | A1 | 5/2011 | Tomobe et al. | |
| 2011/0270798 | A1 * | 11/2011 | Nagasaka | G01C 21/32 |
| | | | | 707/609 |
| 2011/0282575 | A1 | 11/2011 | Masuda et al. | |
| 2013/0117322 | A1 | 5/2013 | Fischer et al. | |
| 2017/0116487 | A1 | 4/2017 | Yamazaki et al. | |
| 2019/0063931 | A1 | 2/2019 | Aoyama et al. | |
| 2019/0063946 | A1 | 2/2019 | Aoyama et al. | |

FOREIGN PATENT DOCUMENTS

| | | |
|---|---|---|
| JP | 2003-077095 A | 3/2003 |
| JP | 2008-216268 A | 9/2008 |
| JP | 2011-069665 A | 4/2011 |
| JP | 2011-069666 A | 4/2011 |
| JP | 2011-080774 A | 4/2011 |
| JP | 2014020852 A | 2/2014 |
| JP | 2016-125952 A | 7/2016 |

OTHER PUBLICATIONS

United States Patent and Trademark Office, Non-Final Office Action issued to U.S. Appl. No. 16/080,533 dated Nov. 22, 2019, 27 pages.
United States Patent and Trademark Office, Notice of Allowance issued to U.S. Appl. No. 16/080,533 dated Mar. 23, 2020, 9 pages.
United States Patent and Trademark Office, Notice of Allowance issued to U.S. Appl. No. 16/080,533 dated Mar. 30, 2020, 9 pages.
Notice of Allowance, United States of Patent and Trademark Office, issued to U.S. Appl. No. 16/080,533 dated Feb. 26, 2021, 19 pages.

* cited by examiner

COMMUNICATION TERMINAL, MOVEMENT GUIDANCE SYSTEM, AND NON-TRANSITORY COMPUTER-READABLE RECORDING MEDIUM STORING COMPUTER PROGRAM

INCORPORATION BY REFERENCE

The disclosure of Japanese Patent Application No. 2016-240477 filed on Dec. 12, 2016 including the specification, drawings and abstract is incorporated herein by reference in its entirety.

BACKGROUND

1. Technical Field

The disclosure relates to a communication terminal, a movement guidance system, and a non-transitory computer-readable recording medium storing computer program that perform movement guidance for a mobile object.

2. Description of Related Art

Recently, navigation devices that can perform traveling guidance for a vehicle to allow a driver to easily arrive at a desired destination have often been mounted in vehicles. Here, a navigation device is a device that can detect a current position of a vehicle using a GPS receiver and the like, acquire map information corresponding to the current position from a recording medium such as a DVD-ROM or an HDD or via a network, and display the acquired map information on a liquid crystal monitor. The navigation device has a route searching function of searching for an optimal route from a point of departure (for example, the current position of the vehicle) to a set destination when the driver sets a desired destination and a traveling guidance function of performing traveling guidance along the searched route (a guidance route). Recent mobile phones, personal digital assistants (PDAs), smartphones, personal computers, are the like (which are hereinafter referred to as communication terminals which include the navigation device) may have the same functions as the navigation device.

Here, new roads (newly constructed roads) are constructed every year all over Japan. Accordingly, existing roads disappear, intersections are added, or shapes of existing roads or intersections are changed. In this case, there is a problem in that information on newly constructed roads which have been newly constructed after map information of a communication terminal has been prepared is not registered in the map information. That is, in a communication terminal with map information not including newly constructed roads and the like, since the newly constructed roads and the like are not targets for route search or guidance, a circuitous guidance route not passing through the newly constructed roads and the like may be searched for or real roads or intersections may not be shown in a map image, that is, appropriate movement guidance may not be performed.

Therefore, a configuration in which information used for movement guidance is acquired from a server device having newest map information and movement guidance is performed using the acquired information has been proposed recently. For example, Japanese Unexamined Patent Application Publication No. 2003-77095 (JP 2003-77095 A) proposes a technique in which a server device searches for a route when a route search request is received from a navigation device and transmits mesh codes and version information of meshes through which the searched route passes along with the searched route to a navigation device, and the navigation device determines whether the version of corresponding mesh data (map information) is older than mesh data stored in the server device based on the mesh codes and the version information transmitted from the server device and requests mesh data of a newest version for a mesh determined to be older from the server device.

SUMMARY

However, in the technique disclosed in JP 2003-77095 A, updating of map information which is performed in the communication terminal is not considered at all. As a result, there is a problem in that unnecessary mesh data is acquired from the server device or necessary mesh data is not acquired. This problem will be described below in detail.

Here, for example, when a power supply is turned on or at a time at which a user's operation is received, a communication terminal acquires information necessary for updating of map information by communication with a server or from a storage medium such as a memory card and performs updating of map information. However, updating is not basically performed on all areas and areas to be updated are not fixed. For example, when a surrounding of a house and a destination are set, surroundings of the destination are also updated. When information necessary for updating is acquired in advance, it cannot be said that map information is updated to newest map information at a time point at which updating is performed. Accordingly, when an update state of map information in the communication terminal is not accurately managed, it is not possible to determine whether an area requires mesh data. However, in the technique disclosed in JP 2003-77095 A, since means that manages the update state of map information in the communication terminal is not provided, for example, mesh data of an area of which newest map information is stored in the communication terminal (that is, an area of which mesh data is not necessary) may be acquired from the server device. Mesh data of an area of which newest map information is not stored in the communication terminal (that is, an area of which mesh data is necessary) may not be acquired.

The disclosure provides a communication terminal, a movement guidance system, and a computer program that can satisfactorily acquire only guidance information necessary for the communication terminal to perform movement guidance for a mobile object from a server device and reduce communication costs by managing an update state of map information in the communication terminal.

A first aspect of the disclosure relates to a communication terminal that is connected to a server device to communicate bidirectionally and that performs movement guidance for a mobile object based on guidance information delivered from the server device, the communication terminal includes: a memory configured to store terminal-side map information for each unit section; a map information updating unit configured to update the terminal-side map information to map information of a new version for each unit section based on information acquired from the outside; an area update information acquiring unit configured to acquire area update information in which a section corresponding to an update target area which is to be updated by the map information updating unit and a section not corresponding to the update target area are identified for each unit section of the map information; an area identification information acquiring unit configured to acquire area identification information in which a section corresponding to an old information area in which the terminal-side map information is map information of an older version than device-side map information of the server device and a section not corresponding to the old information area are identified for each unit section of the map information; a guidance information requesting unit configured to request guidance information from the server device for performing movement guidance for the mobile object based on the area update information and the area identification information; and a movement guidance unit configured to perform movement guidance for the mobile object based on the guidance information delivered from the server device in response to the request from the guidance information requesting unit.

A second aspect of the disclosure relates to a non-transitory computer-readable recording medium storing computer program, the computer program comprising: update logic that updates terminal-side map information of a communication terminal, which is connected to a server device to communicate bidirectionally and performs movement guidance for a mobile object based on guidance information delivered from the server device, to map information of a new version for each unit section based on information acquired from the outside; first acquiring logic that acquires area update information in which a section corresponding to an update target area which is to be updated and a section not corresponding to the update target area are identified for each unit section of map information; second acquiring logic that acquires area identification information in which a section corresponding to an old information area in which the terminal-side map information is map information of an older version than device-side map information of the server device and a section not corresponding to the old information area are identified for each unit section of the map information; request logic that requests guidance information from the server device for performing movement guidance for the mobile object based on the area update information and the area identification information; and guide logic that performs movement guidance for the mobile object based on the guidance information delivered from the server device in response to the request.

A third aspect of the disclosure relates to a movement guidance system, the movement guidance system includes: a server device; and a communication terminal that is connected to the server device to communicate bidirectionally and that performs movement guidance for a mobile object based on guidance information delivered from the server device, wherein the communication terminal includes a map information updating unit configured to update terminal-side map information of the communication terminal to map information of a new version for each unit section based on information acquired from the outside, an area update information acquiring unit configured to acquire area update information in which a section corresponding to an update target area which is to be updated and a section not corresponding to the update target area are identified for each unit section of the map information, an area identification information acquiring unit configured to acquire area identification information in which a section corresponding to an old information area in which the terminal-side map information is map information of an older version than device-side map information of the server device and a section not corresponding to the old information area are identified for each unit section of the map information, a guidance information requesting unit configured to request guidance information from the server device for performing movement guidance for the mobile object based on the area update information and the area identification information, and a movement guidance unit configured to perform movement guidance for the mobile object based on the guidance information delivered from the server device in response to the request from the guidance information requesting unit, and the server device includes a guidance information delivering unit configured to deliver the guidance information requested by the communication terminal to the communication terminal in response to the request for the guidance information from the communication terminal.

According to the above aspects of the disclosure, it is possible to satisfactorily acquire only guidance information necessary for the communication terminal to perform movement guidance for a mobile object from a server device by managing an update state of map information in the communication terminal. As a result, unnecessary guidance information is not acquired from the server device and it is possible to reduce communication costs. It is possible to avoid a phenomenon in which necessary guidance information cannot be acquired.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
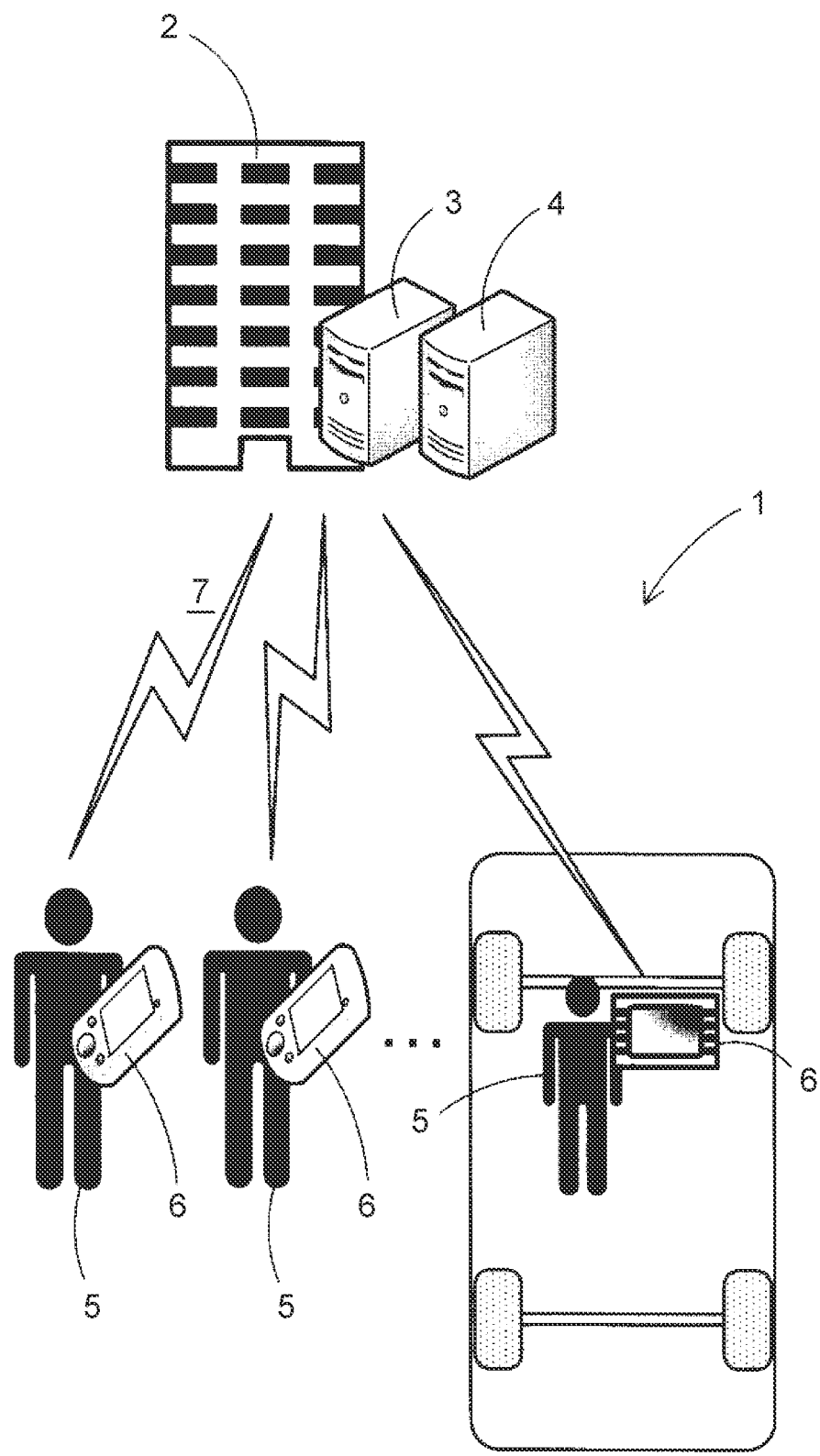
FIG. 1 is a diagram illustrating a schematic configuration of a movement guidance system according to an embodiment of the disclosure.
Figure 2:
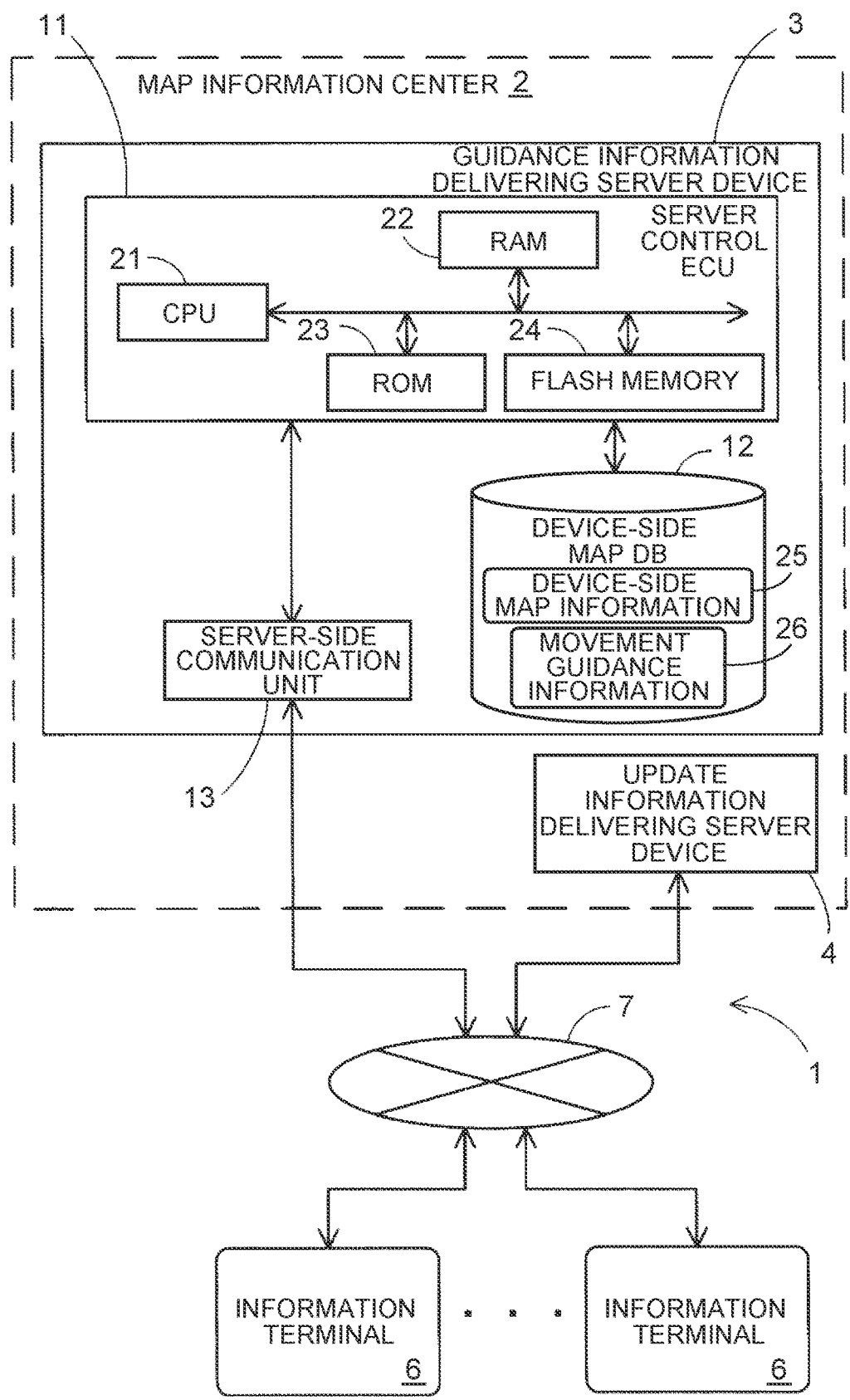
FIG. 2 is a block diagram illustrating a configuration of the movement guidance system according to the embodiment.

Hereinafter, a communication terminal, a movement guidance system, and a computer program according to an embodiment of the disclosure will be described in detail with reference to the accompanying drawings. First, a schematic configuration of a movement guidance system 1 including a communication terminal according to the embodiment will be described with reference to FIGS. 1 and 2. FIG. 1 is a diagram illustrating a schematic configuration of the movement guidance system 1 according to the embodiment. FIG. 2 is a block diagram illustrating a configuration of the movement guidance system 1 according to the embodiment.

As illustrated in FIG. 1, the movement guidance system 1 according to this embodiment basically includes a guidance information delivering server device 3 and an update information delivering server device 4 which are included in a map information center 2 and a communication terminal 6 which is carried by a user 5. The guidance information delivering server device 3, the update information delivering server device 4, and the communication terminal 6 are configured to transmit and receive electronic data to and from each other via a communication network 7. Examples of the communication terminal 6 include a mobile phone, a smartphone, a tablet type terminal, a personal computer, and a navigation device. The user 5 may be in a vehicle or may not be in a vehicle. The guidance information delivering server device 3 and the update information delivering server device 4 may be included in the same center or may be included in different centers.

Here, the guidance information delivering server device 3 performs route search in response to a request from the communication terminal 6. Specifically, when a destination is set in the communication terminal 6 or when a route is re-searched (rerouting is performed), information required for route search such as a point of departure or a destination along with a route search request is transmitted from the communication terminal 6 to the guidance information delivering server device 3 (here, information on a destination does not need to be transmitted in the case of re-searching). The guidance information delivering server device 3 having received the route search request performs route search using map information of the guidance information delivering server device 3 and specifies a recommended route from the point of departure to the destination. Thereafter, the specified recommended route is transmitted to the communication terminal 6 which is a request source. The communication terminal 6 sets the received recommended route as a guidance route and performs movement guidance along the guidance route. Accordingly, even when the map information stored in the communication terminal 6 at the time of route search is map information of an old version, it is possible to set an appropriate guidance route based on the map information of a newest version stored in the guidance information delivering server device 3.

The guidance information delivering server device 3 delivers movement guidance information for performing movement guidance for a user in the communication terminal 6 in response to a request from the communication terminal 6 in addition to delivery of the searched route. The movement guidance information is prepared based on map information of a newest version and is information which is used for the communication terminal 6 to specify a current position, to perform traveling guidance along the guidance route, and to display an image to correspond to the map information of a newest version as will be described later. The communication terminal 6 can use the movement guidance information delivered from the guidance information delivering server device 3 to perform movement guidance along the guidance route searched for by the guidance information delivering server device 3 based on the map information of a newest version even when the map information stored in the communication terminal 6 is map information of an old version.

On the other hand, the update information delivering server device 4 is a server that generates data for updating the map information of an old version stored in the communication terminal 6 to map information of a new version in which newly constructed or removed roads or facilities are reflected (hereinafter referred to as map update information) and delivers the generated map update information. An updating method of rewriting all map information stored in the communication terminal 6 (hereinafter referred to as a full update) and an updating method of rewriting only the map information of a specific area (hereinafter referred to as a partial update) can be used as the method of updating the map information, and the map information is updated specifically using the partial update (MOD) in this embodiment. An area to be updated in the partial update is basically set to an area around a house of the user 5 which is registered in advance. However, when a destination is set in the communication terminal 6, areas around the destination and the guidance route are set to be updated.

The map information stored in the communication terminal 6 may be updated using a medium such as a memory card or a DVD. In this case, the update information delivering server device 4 is not necessary.

On the other hand, an information terminal which is carried by the user 5 and which has a navigation function is used as the communication terminal 6, and examples thereof include a mobile phone, a smartphone, a tablet type terminal, a personal computer, and a navigation device.

The navigation function includes functions of searching for a route corresponding to conditions designated by the user, displaying a map image around the current position of the user 5, displaying the current position of the user 5 in the displayed map image, and performing movement guidance along the set guidance route. All of the navigation functions do not need to be provided in the communication terminal 6, and the disclosure can be implemented as long as the communication terminal has at least the function of performing movement guidance for the user.

The communication network 7 includes a plurality of base stations disposed all over the country and communication companies that manage and control the base stations, and is constituted by connecting the base stations and the communication companies in a wired (such as optical fibers or ISDN) or wireless manner. Here, each base station includes a transceiver (a transmitter/receiver) and an antenna for communication with the communication terminal 6. Each base station performs radio communication with the communication companies, serves as a terminal of the communication network 7, and serves to relay communication of the communication terminal 6 within a range in which radio waves of the base station arrive (a cell) with the guidance information delivering server device 3 and the update information delivering server device 4.

The configuration of the guidance information delivering server device 3 in the movement guidance system 1 will be described below in more detail with reference to FIG. 2. As illustrated in FIG. 2, the guidance information delivering server device 3 includes a server control ECU 11, a device-side map DB 12 which is information recording means connected to the server control ECU 11, and a server-side communication unit 13.

The server control ECU (Electronic Control Unit) 11 is an electronic control unit that controls the whole guidance information delivering server device 3 and includes a CPU 21 serving as a calculation unit and a control unit, a RAM 22 which is used as a working memory for the CPU 21 to perform various calculation processes, a ROM 23 on which a movement guidance processing program (see FIGS. 6 and 7) and the like in addition to a control program are recorded, and an internal storage device such as a flash memory 24 which stores a program read from the ROM 23. The server control ECU 11 includes various means serving as processing algorithms along with an ECU of the communication terminal 6 which will be described later. For example, the guidance information delivering means delivers guidance information requested from the communication terminal 6 to the communication terminal 6 when the guidance information is requested from the communication terminal 6.

The device-side map DB 12 is storage means in which device-side map information 25 which is map information of a newest version registered based on input data from the outside or an input operation is divided into areas (for example, level 10 meshes of 20 km square) and stored. Here, a version is preparation time information for specifying a time at which the map information was prepared, a time at which the updating was finally performed, or a time at which the map updating information (the update program) was prepared when the updating was finally performed, and the time at which the map information was prepared or the like can be specified with reference to the version.

Here, the device-side map information 25 has basically the same structure as the map information stored in the communication terminal 6, and includes a variety of information which is required for route search, route guidance, and map display such as a road network. For example, the device-side map information includes link data on roads (links), node data on nodes, intersection data on intersections, point data on points such as facilities, map display data for displaying a map, search data for searching for a route, and detection data for detecting a point.

As the search data, a variety of data which is used for a route searching process of searching for a route from a point of departure (for example, the current position of the vehicle) to the set destination as will be described later is recorded. For example, cost calculation data which is used to calculate a search cost such as a cost obtained by digitizing a degree of suitableness as a route for intersections (hereinafter referred to as an intersection cost) and a cost obtained by digitizing a degree of suitableness as a route for links constituting a road (hereinafter referred to as a link cost) is stored.

Separately from the device-side map information 25, the movement guidance information 26 which is information for specifying a current position or performing traveling guidance along a guidance route in the communication terminal 6 to correspond to the map information of a newest version is divided into areas (for example, level 13 meshes of 2.5 km square) and stored in the device-side map DB 12. The movement guidance information 26 may be included in the device-side map information 25.

The movement guidance information 26 includes matching data which is required for performing map matching of the current position of the user, guidance data which is required for guidance for causing the user to move along the guidance route such as guidance to right and left turns at a guidance intersection, and display data which is required for displaying a map image or a guidance screen. The matching data includes, for example, data for specifying a road shape. The guidance data includes, for example, data for specifying a shape of an intersection or a connection relationship between intersections and roads. The display data includes data for displaying a map image including a road network or a guidance screen for performing movement guidance on a display of the communication terminal 6.

When a route search request is received from the communication terminal 6 as will be described later, the server control ECU 11 searches for a route from a point of departure to a destination using the device-side map information 25. The searched route is delivered to the communication terminal 6 having requested the route search. The server control ECU 11 delivers the movement guidance information 26 to the communication terminal 6 if necessary. Specifically, the movement guidance information 26 for a target area to which there is a likelihood that the communication terminal 6 will move (for example, an area around the current position of the communication terminal 6 or an area around a guidance route set in the communication terminal 6) and in which the version of the map information stored in the communication terminal 6 is older than the version of the device-side map information 25 is delivered to the communication terminal 6.

On the other hand, the server-side communication unit 13 is a communication unit that communicates with the communication terminal 6 via the communication network 7. The server-side communication unit 13 can receive traffic information including a variety of information such as traffic jam information, regulation information, and traffic accident information which is transmitted from the internet or a traffic information center such as a vehicle information and communication system (VICS: registered trademark) center or a probe center in addition to the communication terminal 6.

Figure 3:
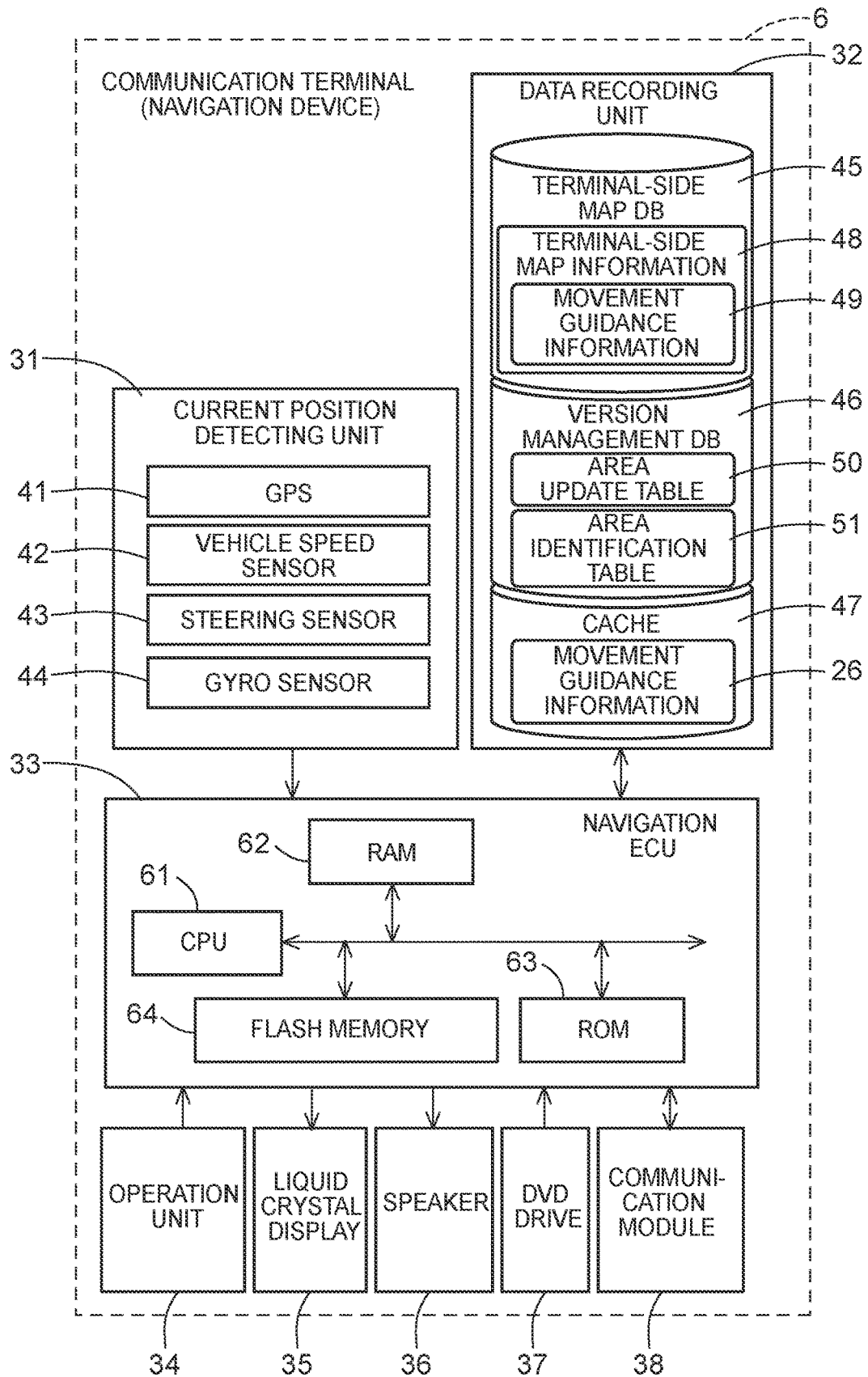
FIG. 3 is a block diagram schematically illustrating a control system of a communication terminal according to the embodiment.

A schematic configuration of the communication terminal 6 will be described below with reference to FIG. 3. In the following description, an example in which traveling guidance for a vehicle as a mobile object is particularly performed using a navigation device installed in the vehicle as the communication terminal 6 will be described. A mobile phone, a tablet type terminal, a personal computer, or the like may be used instead of the navigation device. When a mobile phone or a tablet type terminal is used, it may be possible to perform movement guidance for a mobile object (for example, a pedestrian or a bicycle) other than a vehicle. FIG. 3 is a block diagram schematically illustrating a control system of a navigation device which is the communication terminal 6 according to this embodiment.

As illustrated in FIG. 3, the communication terminal 6 according to this embodiment includes a current position detecting unit 31 that detects a current position of a vehicle (a mobile object) in which the navigation device as the communication terminal 6 is mounted, a data recording unit 32 in which a variety of data is recorded, a navigation ECU 33 that performs various calculation processes based on input information, an operation unit 34 that receives an operation from a user, a liquid crystal display 35 that displays a map or a guidance route to a destination for a user, a speaker 36 that outputs speech guidance for route guidance, a DVD drive 37 that reads a DVD which is a storage medium, and a communication module 38 that communicates with the guidance information delivering server device 3, the VICS center, and the like.

Elements of the communication terminal 6 will be sequentially described below. The current position detecting unit 31 includes a GPS 41, a vehicle speed sensor 42, a steering sensor 43, and a gyro sensor 44 and can detect a current position and a direction of the vehicle, a traveling speed of the vehicle, a current time, and the like. Particularly, the vehicle speed sensor 42 is a sensor that detects a moving distance or a vehicle speed of the vehicle, generates a pulse with rotation of driving wheels of the vehicle, and outputs a pulse signal to the navigation ECU 33. The navigation ECU 33 calculates a rotation speed of the driving wheels or a moving distance by counting the generated pulses. All of the four types of sensors do not need to be included in the communication terminal 6 and one or more types of sensors thereof may be included in the communication terminal 6.

The data recording unit 32 includes an external storage device, a hard disk (not illustrated) which is a recording medium, and a recording head (not illustrated) which is a driver for reading a terminal-side map DB 45, a version management DB 46, a cache 47, and a predetermined program which are recorded in the hard disk and writing predetermined data to the hard disk. The data recording unit 32 may include a nonvolatile memory, a memory card, or an optical disc such as a CD or a DVD instead of the hard disk.

The terminal-side map DB 45 is storage means in which terminal-side map information 48 used for route search or traveling guidance in the communication terminal 6 is stored.

The terminal-side map information 48 stored in the terminal-side map DB 45 includes a variety of information which is necessary for route search, route guidance, and map display in addition to a road network similarly to the device-side map information 25 and includes, for example, link data on roads (links), node data on nodes, intersection data on intersections, point data on points such as facilities, map display data for displaying a map, search data for searching for a route, and detection data for detecting a point. In the terminal-side map DB 45, movement guidance information 49 for specifying a current position, performing a traveling guidance along a guidance route, and displaying an image in the communication terminal 6 is divided into areas (for example, level 13 meshes of 2.5 km square) and stored to correspond to the terminal-side map information 48. The movement guidance information 49 may be information independent from the terminal-side map information 48.

The terminal-side map information 48 (which includes the movement guidance information 49) stored in the terminal-side map DB 45 is updated to map information of a new version by rewriting new data onto data of a corresponding area based on map update information delivered from the update information delivering server device 4 or map update information acquired from a recording medium. Updating of the terminal-side map information 48 is performed at a time at which an accessory power supply (ACC) of the vehicle is turned on or at an arbitrary time which is desired by a user. Only areas around the user's house are basically to be updated. When a destination is set in the communication terminal 6, areas around the destination and areas around a guidance route are to be updated. A certain period may be present until the terminal-side map information 48 is actually updated after the map update information has been acquired.

Accordingly, the terminal-side map information 48 cannot be said to be map information of a newest version. That is, the terminal-side map information 48 in the communication terminal 6 and the terminal-side map DB 45 which is newest map information in the guidance information delivering server device 3 are often different from each other in version.

The version management DB 46 is storage means in which information for specifying the version of the terminal-side map information 48 stored in the terminal-side map DB 45 (for example, a version number, a latest update date and time, and a preparation date and time of the map update information (an update program) which has been finally updated) is recorded for each unit section (for example, each unit mesh) of the map information. Details of the version management DB 46 are updated by updating the terminal-side map information 48 to map information of a new version.

Figure 4:
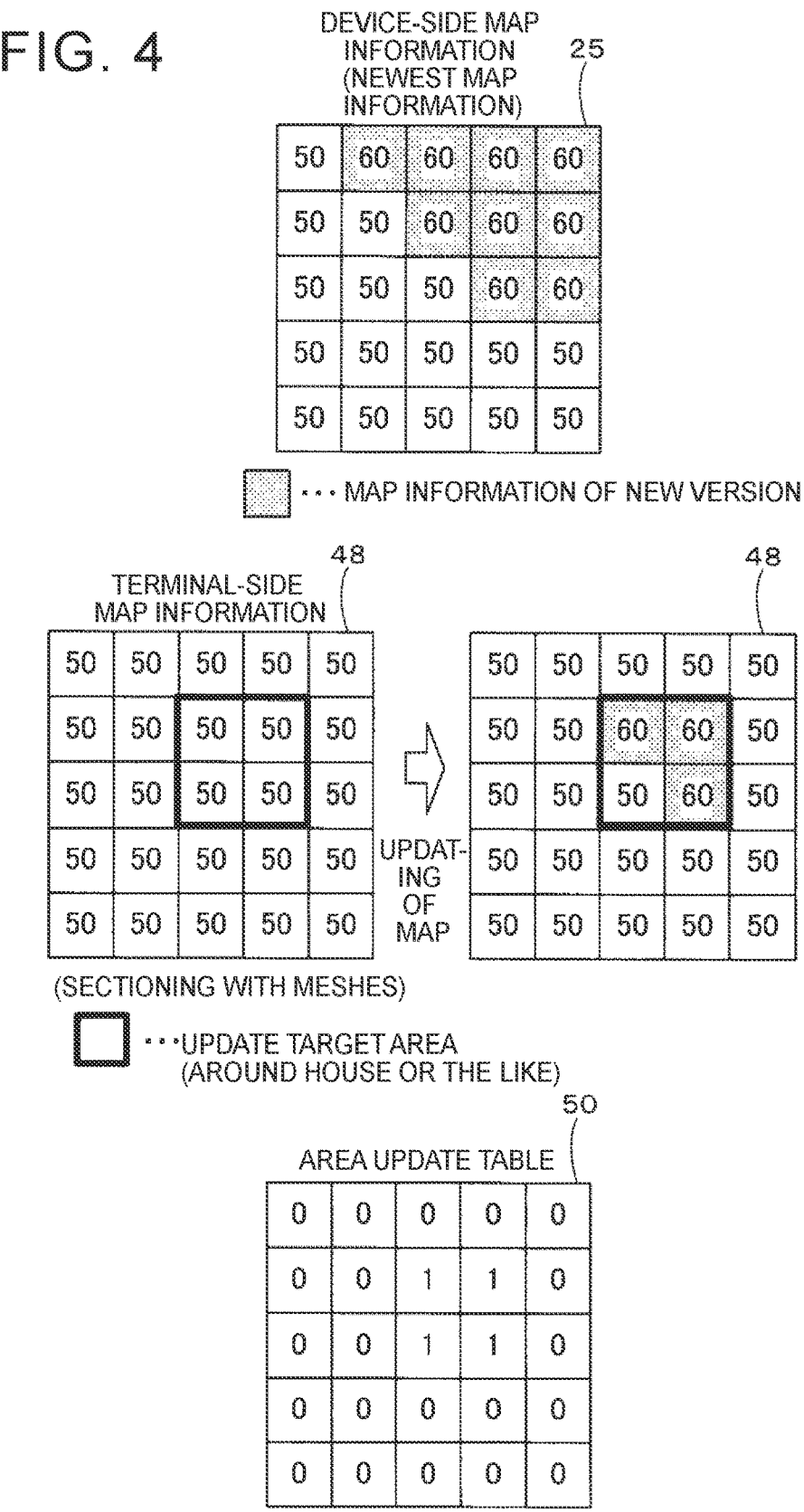
FIG. 4 is a diagram illustrating an example of an area update table.

In the version management DB 46, an area update table (area update information) 50 is stored as information for specifying an area (hereinafter referred to as an update target area) of which the terminal-side map information 48 in the communication terminal 6 is to be updated by the map information updating process most recently performed. The area update table 50 is a table in which a flag for identifying a section corresponding to an update target area and a section not corresponding to an update target area is correlated with each unit section (for example, each unit mesh) of the map information. FIG. 4 illustrates an example of the area update table 50.

In FIG. 4, a state in which a road has been newly constructed and total nine meshes of corresponding areas among the meshes constituting the device-side map information 25 in the guidance information delivering server device 3 is updated from a previous version "50" to a new version "60" is illustrated. In this state, for example, when the ACC of the communication terminal 6 is turned on, a process of updating the terminal-side map information 48 is performed and the meshes corresponding to an update target area in the terminal-side map information 48 are updated to the version "60." For example, the update target area includes meshes around a destination and meshes around a guidance route when the destination is set in the communication terminal 6, in addition to meshes around a house registered in advance. Meshes around the house are not necessarily included in an update target area and, for example, map information of an area of which map information of a newer version is present at a time point at which updating (an area with a version "70" in the example illustrated in FIG. 4) may not be updated (that is, be excluded from the update target area).

As illustrated in FIG. 4, the area update table 50 correlates each mesh with a flag for identifying a section corresponding to an update target area and a section not corresponding to an update target area. Specifically, "1" is correlated with a mesh corresponding to an update target area, and "0" is corrected with a mesh not corresponding to an update target area. In the example illustrated in FIG. 4, the area update table 50 with 5×5 meshes is illustrated for the purpose of simplification of explanation, but the actual area update table 50 is a table in which meshes (for each area and each layer when meshes include a plurality of layers) constituting national areas are correlated with flags.

As a result, the navigation ECU 33 can easily specify an area to be updated by a process of updating the terminal-side map information 48 which has been most recently performed with reference to the area update table 50. The area update table 50 is appropriately updated when the process of updating the terminal-side map information 48 is performed. A criterion common to the guidance information delivering server device 3 and the communication terminal 6 is used as an area sectioning criterion in the area update table 50.

In the version management DB 46, an area identification table (area identification information) 51 is stored as information for specifying an area (hereinafter referred to as an old information area) with map information in which the terminal-side map information 48 in the communication terminal 6 has an older version than the device-side map information 25 in the guidance information delivering server device 3. The area identification table 51 is a table in which a flag for identifying a section corresponding to the old information area and a section not corresponding to the old information area is correlated with each unit section (for example, each unit mesh) of map information. An example of the area identification table 51 is illustrated in FIG. 5.

Figure 5:
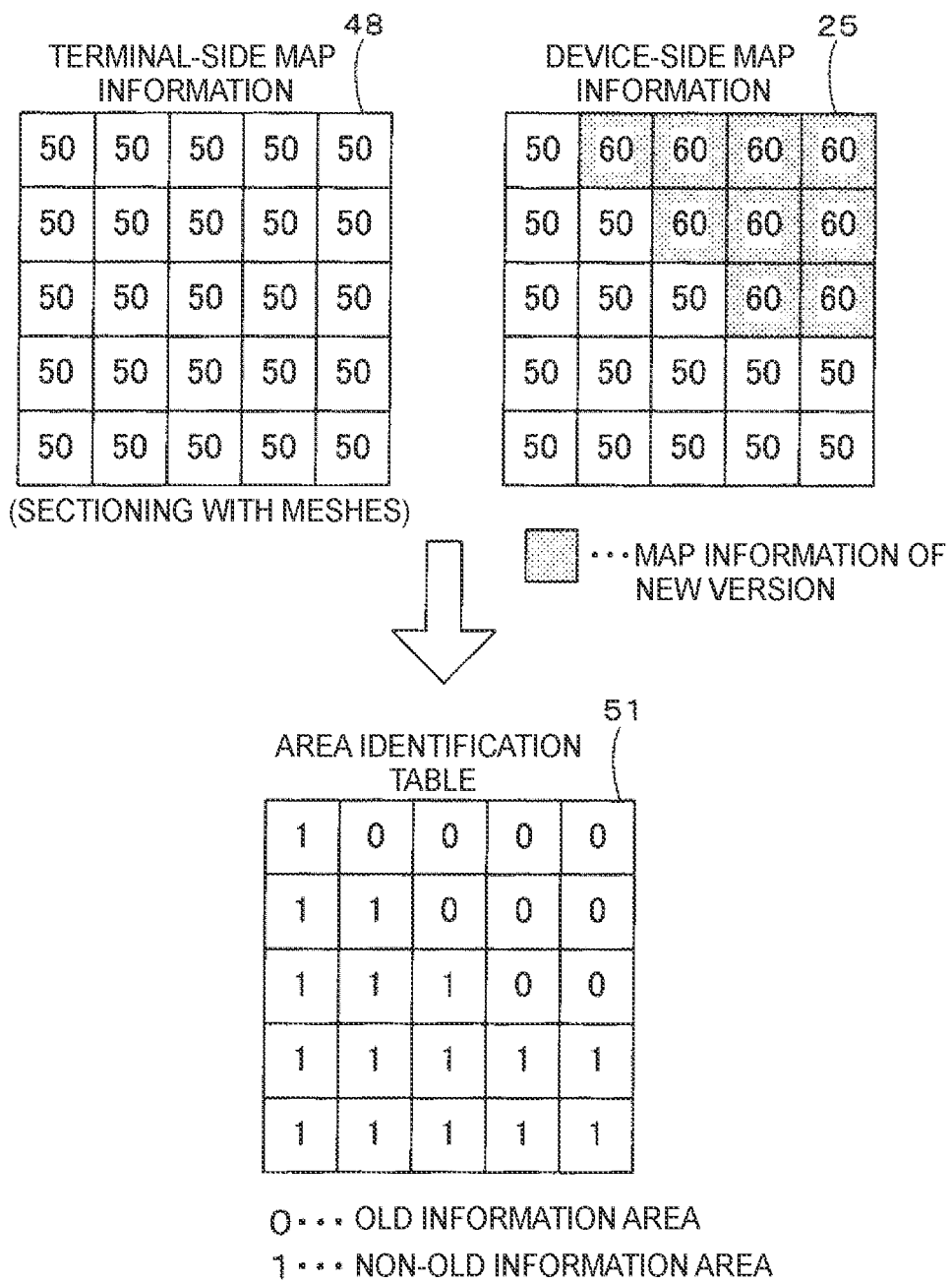
FIG. 5 is a diagram illustrating an area identification table.

In FIG. 5, a state in which a road has been newly constructed and total nine meshes of corresponding areas among the meshes constituting the device-side map information 25 in the guidance information delivering server device 3 is updated from a previous version "50" to a new version "60" is illustrated. In this state, when the terminal-side map information 48 in the communication terminal 6 is not yet updated to a version "60" at the present time, the terminal-side map information 48 of a mesh of which the device-side map information 25 has been updated to a version "60" is maintained at a version "50." That is, there is an old information area with map information in which the terminal-side map information 48 in the communication terminal 6 has an older version than the device-side map information 25 in the guidance information delivering server device 3. As illustrated in FIG. 5, the area identification table 51 correlates each mesh with a flag for identifying a section corresponding to an old information area and a section not corresponding to an old information area. Specifically, "0" is correlated with a mesh corresponding to an old information area, and "1" is corrected with a mesh not corresponding to an old information area. In the example illustrated in FIG. 5, the area identification table 51 with 5×5 meshes is illustrated for the purpose of simplification of explanation, but the actual area identification table 51 is a table in which meshes (for each area and each layer when meshes include a plurality of layers) constituting national areas are correlated with flags.

As a result, the navigation ECU 33 can easily specify an old information area (that is, an area with map information in which the terminal-side map information 48 in the communication terminal 6 has an older version than the device-side map information 25 in the guidance information delivering server device 3) with reference to the area identification table 51. The area identification table 51 is appropriately updated based on information transmitted from the guidance information delivering server device 3. For example, when the device-side map information 25 is updated to map information of a new version, the area identification table 51 is updated accordingly. A criterion common to the guidance information delivering server device 3 and the communication terminal 6 is used as an area sectioning criterion in the area identification table 51.

On the other hand, the cache 47 is storage means in which the movement guidance information 26 delivered from the guidance information delivering server device 3 is temporarily stored. In the movement guidance system 1 according to this embodiment, as described above, the movement guidance information 26 of areas (for example, around the current position of the vehicle and around the guidance route set in the communication terminal 6) in which there is a likelihood that the vehicle will travel in the future and areas of which the version of the terminal-side map information 48 in the communication terminal 6 is older than that of the device-side map information 25 is delivered from the guidance information delivering server device 3 and is stored in the cache 47. Here, the movement guidance information 26 is information for specifying the current position in the communication terminal 6, performing traveling guidance along a guidance route, and displaying an image to correspond to newest map information as described above.

The navigation ECU 33 performs specification of the current position of the vehicle, traveling guidance along a guidance route, and displaying of an image using the movement guidance information 26 of a new version stored in the cache 47, instead of the map information or movement guidance information of an old version stored in the terminal-side map DB 45, for an area of which the version of the terminal-side map information 48 in the communication terminal 6 is older than that of the device-side map information 25.

Regarding the movement guidance information 26 stored in the cache 47, when a storage area of the cache 47 is insufficient, the movement guidance information 26 stored in the cache 47 is preferentially deleted from information with a lowest residual priority. The residual priority of the movement guidance information 26 of an area around the current position of the vehicle or an area around the guidance route set in the communication terminal 6 is set to be higher than that of the movement guidance information 26 of other areas.

On the other hand, the navigation ECU (Electronic Control Unit) 33 is an electronic control unit that controls the communication terminal 6 as a whole and includes a CPU 61 serving as a calculation unit and a control unit, a RAM 62 which is used as a working memory for the CPU 61 to perform various calculation processes and in which route data when a route has been searched for or the like is stored, a ROM 63 on which a movement guidance processing program (see FIGS. 6 and 7) and the like in addition to a control program are recorded, and an internal storage device such as a flash memory 64 which stores a program read from the ROM 63. The navigation ECU 33 includes various means serving as processing algorithms along with an ECU of the guidance information delivering server device 3. For example, the map information updating means updates the map information in the communication terminal 6 to map information of a new version for each unit section based on information acquired from the outside. The area update information acquiring means acquires the area update table 50 in which a section corresponding to an updated area which has been updated by the map information updating means and a section not corresponding to the updated area are identified for each unit section of map information. The area identification information acquiring means acquires the area identification table 51 in which a section corresponding to an old information area with map information in which the map information in the communication terminal 6 has an older version than the map information in the guidance information delivering server device 3 and a section not corresponding to an old information area are identified for each unit section of map information. The guidance information requesting means requests guidance information for performing movement guidance for a mobile object from the guidance information delivering server device 3 based on the area update table 50 and the area identification table 51. The movement guidance means performs movement guidance for the mobile object based on the guidance information delivered from the guidance information delivering server device 3 in response to the request.

The operation unit 34 is operated when a user input a point of departure as a traveling start point and a destination as a traveling end point or the like and includes a plurality of operation switches (not illustrated) such as various keys and buttons. The navigation ECU 33 performs control for performing various corresponding operations based on a switch signal output by pushing a switch. The operation unit 34 may include a touch panel disposed on a front surface of the liquid crystal display 35. The operation unit may include a microphone and a speech recognition device.

A map image including roads, traffic information, operation guidance, an operation menu, key guidance, a guidance route from a point of departure to a destination, guidance information along the guidance route, news, weather forecast, time, mail, a television program, and the like are displayed on the liquid crystal display 35. An HUD or an HMD may be used instead of the liquid crystal display 35.

The speaker 36 outputs speech guidance for traveling guidance along the guidance route or guidance of traffic information based on an instruction from the navigation ECU 33.

The DVD drive 37 is a drive that can read data recorded in a recording medium such as a DVD or a CD. Reproduction of music or video, updating of the terminal-side map DB 45, and the like are performed based on the read data. A card slot for reading and writing a memory card may be provided instead of the DVD drive 37.

The communication module 38 is, for example, a communication device that receives a variety of information such as map update information, route information, movement guidance information, and traffic information transmitted from the guidance information delivering server device 3, the update information delivering server device 4, the VICS (registered trademark) center, or the probe center and examples thereof include a mobile phone and a DCM.

Figure 6:
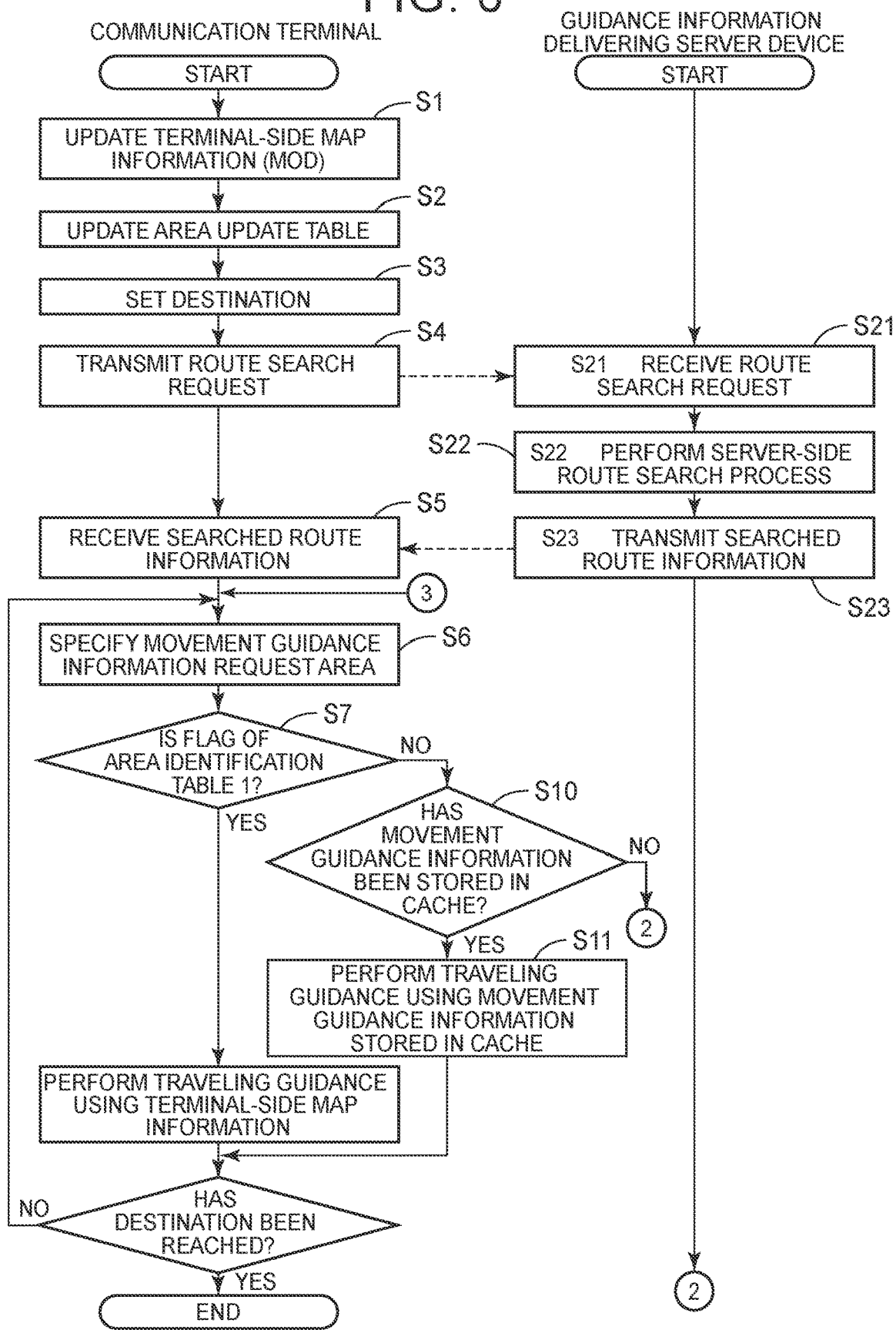
FIG. 6 is a flowchart illustrating a movement guidance processing program according to the embodiment.
Figure 7:
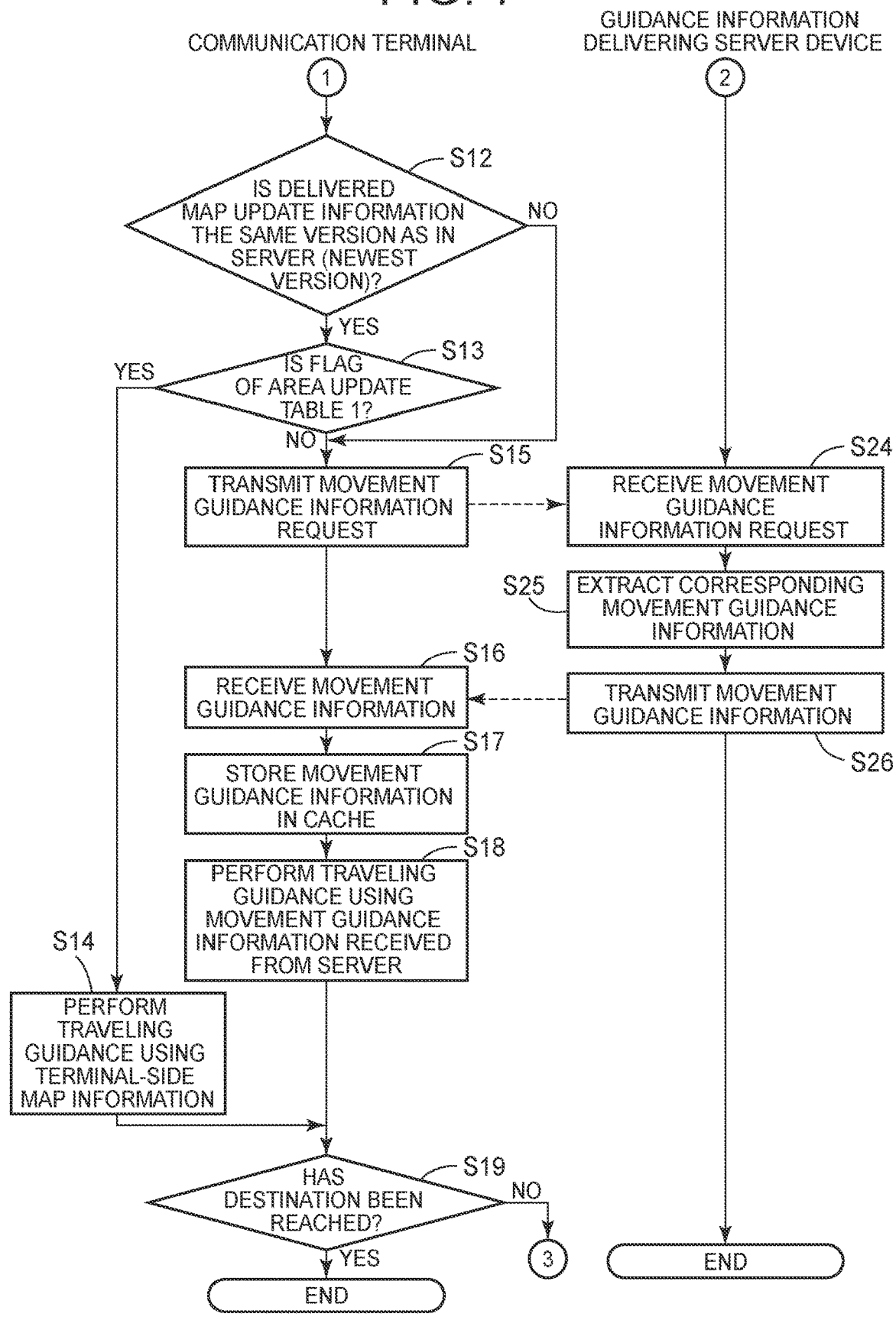
FIG. 7 is a flowchart illustrating a movement guidance processing program according to the embodiment.

A movement guidance processing program which is executed by the guidance information delivering server device 3 and the communication terminal 6 in the movement guidance system 1 having the above-mentioned configuration will be described below with reference to FIGS. 6 and 7. FIGS. 6 and 7 are flowcharts illustrating the movement guidance processing program according to this embodiment. Here, the movement guidance processing program is performed after an ACC power supply (an accessory power supply) of the vehicle is turned on and is a program that searches for a route from a point of departure to a destination and performs traveling guidance along a guidance route. When the communication terminal 6 is not a navigation device, the program is executed after a main power supply of the communication terminal 6 instead of the ACC power supply is turned on (started). The program illustrated in the flowcharts of FIGS. 6 and 7 is stored in the RAM or the ROM in the guidance information delivering server device 3 or the communication terminal 6 and is executed by the CPU 21 or the CPU 61.

First, the movement guidance processing program which is executed by the CPU 61 of the communication terminal 6 will be described below with reference to FIGS. 6 and 7. In Step (hereinafter abbreviated to S) 1, the CPU 61 performs an updating process of updating the terminal-side map information 48 stored in the terminal-side map DB 45 to map information of a new version. In this embodiment, the map information is updated particularly by a partial update (MOD). Data (map update information) for updating the terminal-side map information 48 to map information of a new version is generated in the update information delivering server device 4 and is delivered to the communication terminal 6. The map update information may be acquired via a medium such as a memory card or a DVD.

An area which is to be updated by the partial update is basically set to an area around a house of the user 5 which is registered in advance. When a destination is set in the communication terminal 6, areas around the destination and a guidance route are set to be updated. An area around the house is not necessarily to be updated, but map information of an area which is located around the house but in which there is map information of a newer version at a time point of updating may not be updated (that is, be excluded from an update target area). Instead of performing acquisition of map update information and updating of the terminal-side map information 48 at a time at which the ACC of the vehicle is once turned on for the purpose of shortening of a processing time, the processing is performed basically twice. That is, the map update information is acquired at a time at which the ACC is first turned on and updating of the terminal-side map information 48 is performed using the acquired map update information at a time at which the ACC is then turned on.

Then, the area update table 50 in the communication terminal 6 is updated. The area update table 50 is a table in which a flag for identifying a section corresponding to an update target area to be updated by the map information updating process which was most recently performed and a section not corresponding to an update target area is correlated with each unit section (for example, each unit mesh) of the map information as described above (see FIG. 4). A flag of "1" is correlated with a mesh corresponding to an update target area, and a flag of "0" is corrected with a mesh not corresponding to an update target area. Accordingly, in S2, the CPU 61 rewrites the flags correlated with meshes which are used as an update target in S1 (regardless of whether map information thereof has been actually updated to a new version) with "1" and rewrites the flags of the other meshes with "0."

Subsequently, in S3, the CPU 61 sets a destination of a route in the communication terminal 6. The destination is set basically based on a user's operation (for example, an operation of reading a registered point or an operation of searching or selecting a facility) received via the operation unit 34. When re-searching (rerouting) is performed, the destination currently set in the communication terminal 6 is continuously set without newly setting a destination.

Thereafter, in S4, the CPU 61 transmits a route search request for requesting for searching for a route from a point of departure to the destination to the guidance information delivering server device 3. The route search request includes a terminal ID for specifying the communication terminal 6 which is a transmission source of the route search request and information for specifying a point of departure (for example, the current position of the vehicle) and a destination set in S3 which are search conditions for route search. At the time of rerouting due to departure of the vehicle from a guidance route, the destination is basically the same as in the previous search and thus the information for specifying the destination may not be transmitted.

The communication terminal 6 may perform the route search process to a destination and may transmit the route searched by the communication terminal 6 as the route search request. In this case, the guidance information delivering server device 3 searches for a recommended route using the route searched by the communication terminal 6.

Thereafter, in S5, the CPU 61 receives searched route information transmitted from the guidance information delivering server device 3 in response to the route search request. The searched route information received in S5 is information on a recommended route from a point of departure to a destination (hereinafter referred to as a server-recommended route) which has been searched for using the device-side map information 25 which is map information of a newest version by the guidance information delivering server device 3 in response to the route search request transmitted in S4. The CPU 61 basically sets the server-recommended route received in S5 as a guidance route which is used for traveling guidance for the vehicle in the communication terminal 6. The server-recommended route itself does not need to be set as the guidance route and a route obtained by changing a part of the server-recommended route may be set as the guidance route.

Figure 8:
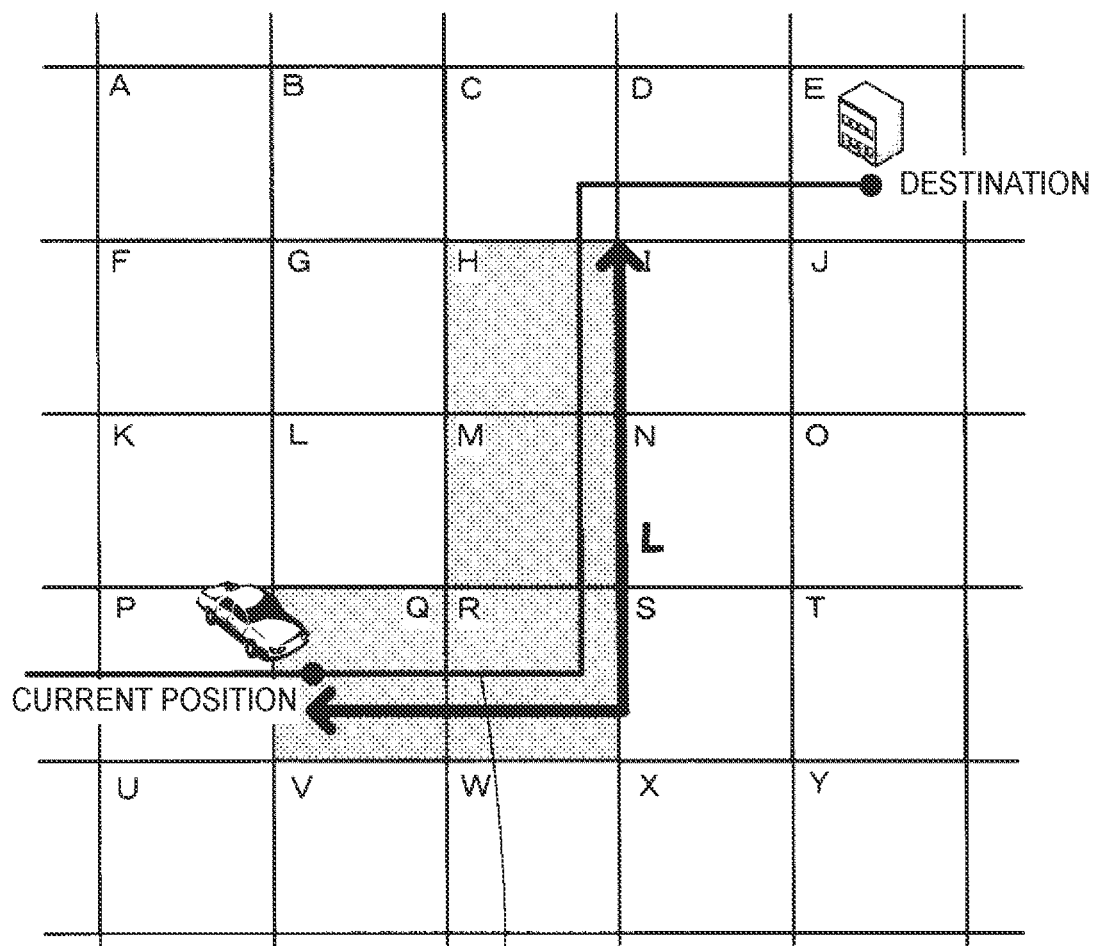
FIG. 8 is a diagram illustrating an area for which movement guidance information is requested.

Then, in S6, the CPU 61 specifies a "movement guidance information request area" which is an area of which movement guidance information is requested from the guidance information delivering server device 3. Specifically, the CPU 61 first specifies meshes including at least a part of the guidance route within a predetermined distance L from the current position of the vehicle toward the destination as a "movement guidance information request area." For example, in the example illustrated in FIG. 8, the meshes including at least a part of the guidance route 71 within a predetermined distance L from the current position of the vehicle toward the destination are meshes H, M, Q, and R. Accordingly, the meshes H, M, R, and Q are specified as the "movement guidance information request area." Only the mesh Q including the current position of the vehicle may be specified as the "movement guidance information request area."

Then, in S7, the CPU 61 acquires the area identification table 51 stored in the version management DB 46 and determines whether the "movement guidance information request area" specified in S6 is an old information area with map information in which the terminal-side map information 48 in the communication terminal 6 has an older version than the device-side map information 25 in the guidance information delivering server device 3. The area identification table 51 is a table in which a section corresponding to an old information area and a section not corresponding to an old information area are identified for each unit mesh, "0" is correlated with a mesh corresponding to an old information area, and "1" is corrected with a mesh not corresponding to an old information area.

When it is determined that the "movement guidance information request area" specified in S6 is not an old information area (flag "1") (YES in S7), that is, when the communication terminal 6 has newest map information for the "movement guidance information request area," the process flow transitions to S8. In a case in which the "movement guidance information request area" includes a plurality of meshes, the process flow transitions to S8 only when it is determined that none of the corresponding meshes is an old information area.

In S8, the CPU 61 performs traveling guidance for the vehicle based on the guidance route. For example, a map image including a road network around the position of the vehicle is displayed, or when a guidance branch point at which the vehicle turns right or left is present at a position of a predetermined distance from the vehicle, an enlarged view of the guidance branch point is displayed or a traveling direction of the vehicle at the guidance branch point is shown. In S8, the CPU 61 performs the traveling guidance based on the terminal-side map information 48 stored in the terminal-side map DB 45. Since the terminal-side map information 48 includes map information of a newest version for an area for which movement guidance is performed, that is, map information of the same version as in the guidance information delivering server device 3 having searched for the guidance route, it is possible to correctly specify the current position of the vehicle and to show the correct traveling direction of the vehicle at a guidance intersection using the terminal-side map information 48.

Thereafter, in S9, the CPU 61 determines whether the vehicle has arrived at the destination.

When it is determined that the vehicle has arrived at the destination (YES In S9), the movement guidance processing program ends. On the other hand, when it is determined that the vehicle has not arrived at the destination (NO in S9), the "movement guidance information request area" is specified again based on a new current position of the vehicle in S6.

On the other hand, when it is determined that the "movement guidance information request area" specified in S6 is an old information area (with a flag of "0") (NO in S7), that is, when it is estimated the communication terminal 6 does not have newest map information for the "movement guidance information request area," the process flow transitions to S10.

In S10, the CPU 61 determines whether movement guidance information of the "movement guidance information request area" specified in S6 is stored in the cache 47. In this embodiment, the movement guidance information delivered from the guidance information delivering server device 3 to the communication terminal 6 is stored in the cache 47 of the communication terminal 6 for a predetermined period (S17).

When it is determined that the movement guidance information of the "movement guidance information request area" specified in S6 is stored in the cache 47 (YES in S10), the process flow transitions to S11. In a case in which the "movement guidance information request area" includes a plurality of meshes, the process flow transitions to S11 only when it is determined that the movement guidance information of all the corresponding meshes is stored in the cache 47.

In S11, the CPU 61 performs traveling guidance for the vehicle based on the guidance route. For example, a map image including a road network around the position of the vehicle is displayed, or when a guidance branch point at which the vehicle turns right or left is present at a position of a predetermined distance from the vehicle, an enlarged view of the guidance branch point is displayed or a traveling direction of the vehicle at the guidance branch point is shown. In S11, the CPU 61 performs the traveling guidance based on the movement guidance information 26 stored in the cache 47. The movement guidance information 26 includes matching data which is required for performing map matching of the vehicle, guidance data which is required for guidance for causing the vehicle to travel along the guidance route such as guidance to right and left turns at a guidance intersection, and display data which is required for displaying a map image or a guidance screen. Accordingly, even when the terminal-side map information 48 stored in the terminal-side map DB 45 does not have a newest version, it is possible to appropriately perform traveling guidance along the guidance route searched based on the map information of a newest version.

On the other hand, when it is determined that the movement guidance information of the "movement guidance information request area" specified in S6 is not stored in the cache 47 (NO in S10), the process flow transitions to S12.

In S12, the CPU 61 determines whether the map update information delivered in the map information updating process which was most recently performed in S1 is information for updating the version of the terminal-side map information 48 to a version (that is, a newest version) of the device-side map information 25 in the guidance information delivering server device 3. Information on the version of the device-side map information 25 is acquired from the guidance information delivering server device 3.

Then, when it is determined that the map update information delivered in the map information updating process which was most recently performed in S1 is information for updating the version of the terminal-side map information 48 to a version (that is, a newest version) of the device-side map information 25 in the guidance information delivering server device 3 (YES in S12), the process flow transitions to S13.

On the other hand, when it is determined that the map update information delivered in the map information updating process which was most recently performed in S1 is not information for updating the version of the terminal-side map information 48 to a version (that is, a newest version)

of the device-side map information 25 in the guidance information delivering server device 3 (NO in S12), that is, when the terminal-side map information 48 of the "movement guidance information request area" was updated in the most recent updating process but does not have a newest version, the process flow transitions to S15. Since updating of the terminal-side map information 48 is performed at two times at which the ACC is turned on as described above, a considerable time may be present until updating is performed after the map update information for updating the terminal-side map information 48 has been acquired. For example, the ACC may be currently turned on after a considerable period elapses after the ACC was previously turned on. In this case, the map update information delivered in the most recent updating process may be information for updating the version to a version other than the newest version.

In S13, the CPU 61 acquires the area update table 50 stored in the version management DB 46 and determines whether the "movement guidance information request area" specified in S6 is an update target area which is an update target in the map information updating process which was most recently performed in S1. The area update table 50 is a table in which a section corresponding to an update target area and a section not corresponding to an update target area are identified for each unit mesh, "1" is correlated with a mesh corresponding to the update target area, and "0" is correlated with a mesh not corresponding to the update target area.

When it is determined that the "movement guidance information request area" specified in S6 is an update target area (with a flag of "1") (YES in S13), that is, when the terminal-side map information 48 of the "movement guidance information request area" was updated to a newest version in the most recent updating process, the process flow transitions to S14. In a case in which the "movement guidance information request area" includes a plurality of meshes, the process flow transitions to S14 only when all the corresponding meshes are determined to be an update target area. Unlike the area update table 50, the area identification table 51 is not updated whenever the terminal-side map information 48 is updated. Accordingly, in the area identification table 51, map information of a section classified as an old information area may have the newest version.

In S14, the CPU 61 performs traveling guidance for the vehicle based on the guidance route. For example, a map image including a road network around the position of the vehicle is displayed, or when a guidance branch point at which the vehicle turns right or left is present at a position of a predetermined distance from the vehicle, an enlarged view of the guidance branch point is displayed or a traveling direction of the vehicle at the guidance branch point is shown. In S14, the CPU 61 performs the traveling guidance based on the terminal-side map information 48 stored in the terminal-side map DB 45. Since the terminal-side map information 48 is updated to map information of a newest version for an area for which movement guidance is performed, that is, map information of the same version as in the guidance information delivering server device 3 having searched for the guidance route, it is possible to correctly specify the current position of the vehicle and to show the correct traveling direction of the vehicle at a guidance intersection using the terminal-side map information 48. Thereafter, the process flow transitions to S19.

On the other hand, when it is determined that the "movement guidance information request area" specified in S6 is not an update target area (with a flag of "0") (NO in S13), that is, when the terminal-side map information 48 of the "movement guidance information request area" was not updated in the most recent updating process and does not have a newest version, the process flow transitions to S15. The determination order of Steps S12 and S13 may be inverted.

On the other hand, in S15, the CPU 61 transmits a request for the movement guidance information 26 for the "movement guidance information request area" specified in S6 to the guidance information delivering server device 3. Here, the movement guidance information 26 is information for specifying the current position in the communication terminal 6, performing traveling guidance along a guidance route, and displaying an image to correspond to the map information of the newest version in the guidance information delivering server device 3 as described above. The request for movement guidance information transmitted in S15 includes a terminal ID for specifying the communication terminal 6 which is a transmission source of the request for movement guidance information and information (for example, a mesh identification number) for specifying an area of which the movement guidance information is requested (the "movement guidance information request area" specified in S6).

Thereafter, in S16, the CPU 61 receives the movement guidance information 26 which is transmitted from the guidance information delivering server device 3 in response to the request for the movement guidance information 26. The movement guidance information 26 includes matching data which is required for performing map matching of the vehicle, guidance data which is required for guidance for causing the vehicle to travel along the guidance route such as guidance to right and left turns at a guidance intersection, and display data which is required for displaying a map image or a guidance screen. That is, the movement guidance information 26 received in S16 is information for specifying the current position in an area in which traveling guidance is performed around the current position of the vehicle, performing traveling guidance along a guidance route, and displaying an image.

Thereafter, in S17, the CPU 61 stores the movement guidance information 26 acquired from the guidance information delivering server device 3 in the cache 47 of the communication terminal 6. The stored movement guidance information 26 is deleted if necessary when a residual capacity of the cache 47 decreases.

Then, in S18, the CPU 61 performs traveling guidance for the vehicle based on the guidance route. For example, a map image including a road network around the position of the vehicle is displayed, or when a guidance branch point at which the vehicle turns right or left is present at a position of a predetermined distance from the vehicle, an enlarged view of the guidance branch point is displayed or a traveling direction of the vehicle at the guidance branch point is shown. In S18, the CPU 61 performs the traveling guidance based on the movement guidance information 26 delivered from the guidance information delivering server device 3 in S16. The movement guidance information 26 includes matching data which is required for performing map matching of the vehicle, guidance data which is required for guidance for causing the vehicle to travel along the guidance route such as guidance to right and left turns at a guidance intersection, and display data which is required for displaying a map image or a guidance screen. Accordingly, even when the terminal-side map information 48 stored in the terminal-side map DB 45 does not have a newest version, it is possible to appropriately perform traveling guidance along the guidance route searched based on the map information of the newest version. Thereafter, the process flow transitions to S19.

A movement guidance processing program which is executed by the CPU 21 of the guidance information delivering server device 3 will be described below.

First, in S21, the CPU 21 receives a route search request which is transmitted from the communication terminal 6. The route search request includes a terminal ID for specifying the communication terminal 6 which is a transmission source of the route search request and information for specifying a point of departure (for example, the current position of the vehicle) and a destination set in S3 which are search conditions for route search.

Then, in S22, the CPU 21 performs a route searching process from the point of departure to the destination using the route search request received in S21 and the device-side map information 25 in the guidance information delivering server device 3, and specifies a recommended route (a server-recommended route) from the point of departure to the destination. The route search request may include a route searched in the communication terminal 6 (hereinafter referred to as a terminal-recommended route). When the terminal-recommended route has been received, the CPU 21 specifies a route including at least a part of the terminal-recommended route as a server-recommended route. More specifically, a route to the destination connected to the terminal-recommended route within a predetermined distance from the point of departure is searched for, and a route in which the terminal-recommended route within the predetermined distance from the point of departure and the searched route are combined is specified as the server-recommended route.

Subsequently, in S23, the CPU 21 transmits searched route information for specifying the server-recommended route specified in S22 to the communication terminal 6 which is a transmission source of the route search request. As a result, the server-recommended route is set as a guidance route in the communication terminal 6.

Thereafter, in S24, the CPU 21 receives a request for the movement guidance information 26 transmitted from the communication terminal 6 after the guidance route has been set. The request for the movement guidance information 26 includes a terminal ID for specifying the communication terminal 6 which is a transmission source of the request for the movement guidance information and information (for example, a mesh number) for specifying an area of which the movement guidance information is requested (the "movement guidance information request area" specified in S6).

Subsequently, in S25, the CPU 21 extracts the movement guidance information 26 of a corresponding area from the device-side map DB 12 based on the request for the movement guidance information 26 received in S24.

Thereafter, in S26, the CPU 21 transmits the movement guidance information 26 extracted in S25 to the communication terminal 6 having transmitted the request. As a result, traveling guidance based on the movement guidance information 26 delivered from the guidance information delivering server device 3 is performed in the communication terminal 6 (S18).

As described above in detail, in the movement guidance system 1, the communication terminal 6, and the computer program which is executed by the communication terminal 6 according to this embodiment, terminal-side map information 48 in the communication terminal 6 is updated to map information of a new version for each unit section of the map information based on information acquired from the outside (S1), and the area update table 50 in which a section corresponding to an update target area to be updated and a section not corresponding to the update target area are identified for each unit section of the map information is acquired (S2). The area identification table 51 in which a section corresponding to an old information area with map information in which the terminal-side map information 48 has an older version than the device-side map information 25 in the guidance information delivering server device 3 and a section not corresponding to the old information area for each unit section of the map information are identified is also acquired, movement guidance information for performing traveling guidance for the vehicle is requested to the guidance information delivering server device 3 based on the area update table 50 and the area identification table 51 (S15), and traveling guidance for the vehicle is performed based on the movement guidance information delivered from the guidance information delivering server device 3 in response to the request (S18). Accordingly, it is possible to satisfactorily acquire only movement guidance information necessary for the communication terminal 6 to perform movement guidance for the vehicle from the guidance information delivering server device 3 by managing an update state of the map information in the communication terminal 6 using the area update table 50. As a result, unnecessary guidance information is not acquired from the guidance information delivering server device 3 and it is possible to reduce communication costs. It is possible to avoid a phenomenon in which necessary guidance information cannot be acquired.

The disclosure is not limited to the above-mentioned embodiment, but can be improved or modified in various forms without departing from the gist of the disclosure. For example, in the embodiment, the area update table 50 or the area identification table 51 is included in the communication terminal 6, but may be included in the guidance information delivering server device 3. The tables may be included in both the communication terminal 6 and the guidance information delivering server device 3. In this case, processes associated with updating of the area update table 50 in S2 and S6 or specifying of the movement guidance information request area may be performed by the guidance information delivering server device 3.

In the embodiment, the communication terminal 6 is configured to request the guidance information delivering server device 3 to deliver the movement guidance information 26 of an area around the current position of the vehicle or around the guidance route, but the movement guidance information 26 of an area of which the map image is displayed on the liquid crystal display 35 may be requested to the guidance information delivering server device 3. As a result, for example, when a map image displayed on the liquid crystal display 35 is scrolled, it is possible to display a map image based on the map information of a newest version.

In the embodiment, the route search process is performed by the guidance information delivering server device 3, but may be performed by the communication terminal 6. In this case, the processes of S4 and S5 are not necessary. The processes subsequent to S6 may be performed in a state in which a guidance route is not set. In this case, an area around the current position of the vehicle is set as an area of which the movement guidance information 26 is requested.

In the embodiment, the area update table 50 or the area identification table 51 are tables in which a mesh corresponding to an update target area or an old information area and a mesh not corresponding thereto are identified for each unit mesh of the map information (see FIGS. 4 and 5), but areas may be identified for each administrative district such as cities/wards/towns/villages instead of each unit mesh.

In the embodiment, the movement guidance information 26 is information which is divided for each mesh of the map information, but the movement guidance information 26 may be information which is divided for each administrative district such as cities/wards/towns/villages instead of each unit mesh.

In the embodiment, the area update table 50 is a table in which a section corresponding to an update target area to be updated in the process of updating the terminal-side map information 48 which was performed most recently in S1 and a section not corresponding to the update target area are identified, but may be a table in which a section corresponding to an update target area to be updated in the process of updating the terminal-side map information 48 several times in the past as well as the most recent process and a section not corresponding to the update target area are identified.

While the communication terminal, the movement guidance system, and the computer program according to an embodiment of the disclosure have been described above, the communication terminal may have the following configuration. In this case, the following advantages can be achieved.

For example, a first configuration is as follows: a communication terminal (6) that is connected to a server device (3) to communicate bidirectionally and that performs movement guidance for a mobile object based on guidance information (26) delivered from the server device, the communication terminal including: map information updating means (61) configured to update terminal-side map information (48) of the communication terminal to map information of a new version for each unit section based on information acquired from the outside; area update information acquiring means (61) configured to acquire area update information (50) in which a section corresponding to an update target area which is to be updated by the map information updating means and a section not corresponding to the update target area are identified for each unit section of the map information; area identification information acquiring means (61) configured to acquire area identification information (51) in which a section corresponding to an old information area in which the terminal-side map information is map information of an older version than a device-side map information of the server device and a section not corresponding to the old information area are identified for each unit section of the map information; guidance information requesting means (61) configured to request the server device for guidance information for performing movement guidance for the mobile object based on the area update information and the area identification information; and movement guidance means (61) configured to perform movement guidance for the mobile object based on the guidance information delivered from the server device in response to the request from the guidance information requesting means. According to the communication terminal having this configuration, it is possible to satisfactorily acquire only guidance information necessary for the communication terminal to perform movement guidance for a mobile object from a server device by managing an update state of map information in the communication terminal. As a result, unnecessary guidance information is not acquired from the server device and it is possible to reduce communication costs. It is possible to avoid a phenomenon in which necessary guidance information cannot be acquired.

A second configuration is as follows. The guidance information requesting means (61) requests the guidance information for sections not corresponding to the update target area and corresponding to the old information area from the server device. According to the communication terminal having this configuration, it is possible for the communication terminals to easily identify a section of which the terminal-side map information is updated to the same version as the server device for each unit section of map information with reference to the area update information and the area identification information. As a result, it is possible to rapidly and accurately specify a section of which guidance information needs to be requested at the time of requesting the server device for guidance information.

A third configuration is as follows. The guidance information requesting means (61) requests the guidance information for sections around a current position of the mobile object and sections around a guidance route set in the communication terminal (6) among the sections not corresponding to the update target area and corresponding to the old information area from the server device (3). According to the communication terminal having this configuration, it is possible to acquire guidance information of an area to which there is a likelihood that the mobile object will move, that is, an area of which guidance information is necessary, from the server device and to appropriately perform movement guidance for the mobile object using the guidance information even when the map information of the communication terminal is map information of an older version than the map information of the server device.

A fourth configuration is as follows. The update target area is an area which is an update target in a process of updating the terminal-side map information (48) which was most recently performed by the map information updating means (61). According to the communication terminal having this configuration, it is possible to easily identify a section of which the terminal-side map information is updated to a newest version in a most recent updating process with reference to the area update information. As a result, it is possible to rapidly and accurately specify a section of which guidance information needs to be requested at the time of requesting the server device for guidance information.

A fifth configuration is as follows. The communication terminal further includes information updating means (61) configured to update the area update information (50) when the terminal-side map information (48) is updated by the map information updating means (61). According to the communication terminal having this configuration, it is possible to manage an update state of map information in the communication terminal to be a newest state.

A sixth configuration is as follows. The area update information (50) is information in which a flag for identifying a section corresponding to the update target area and a section not corresponding to the update target area is correlated with each unit section of the map information, and the area identification information (51) is information in which a flag for identifying a section corresponding to the old information area and a section not corresponding to the old information area is correlated with each unit section of the map information. According to the communication terminal having this configuration, it is possible for the communication terminal to easily identify a section of which the terminal-side map information is updated to the same version as the server device for each unit section of map information with reference to the flags. As a result, it is possible to rapidly and accurately specify a section of which guidance information needs to be requested at the time of requesting the server device for guidance information.

What is claimed is:

1. A communication terminal that is connected to a server device to communicate bidirectionally and that performs movement guidance for a mobile object based on guidance information delivered from the server device, the communication terminal comprising:
an electronic control unit (ECU) including a processor for executing programs stored in memory, the memory configured to store terminal-side map information the ECU configured to:
update the terminal-side map information to map information of a new version based on information acquired from the outside;
acquire area update information, the area update information is a table in which a flag for identifying a section corresponding to an update target area which is to be updated by the ECU and a section not corresponding to the update target area is correlated with each unit section of the map information;
acquire area identification information, the area identification information is a table in which a flag for identifying a section corresponding to an old information area in which the terminal-side map information is map information of an older version than device-side map information of the server device and a section not corresponding to the old information area is correlated with the each unit section of the map information;
request guidance information from the server device for performing movement guidance for the mobile object based on the area update information and the area identification information; and
perform movement guidance for the mobile object based on the guidance information delivered from the server device in response to the request from the ECU,
wherein the guidance information includes matching data which is required for performing map matching of the current position of the mobile object.

2. The communication terminal according to claim 1, wherein the ECU-requests the guidance information from the server device for sections not corresponding to the update target area and corresponding to the old information area.

3. The communication terminal according to claim 2, wherein the ECU-requests the guidance information from the server device for sections around the current position of the mobile object and sections around a guidance route set in the communication terminal among the sections not corresponding to the update target area and corresponding to the old information area.

4. The communication terminal according to claim 3, wherein the update target area is an area which is an update target in a process of updating the terminal-side map information which was most recently performed by the ECU.

5. The communication terminal according to claim 1, the ECU further configured to update the area update information when the terminal-side map information is updated.

6. The communication terminal according to claim 1, wherein the area update information is information in which a flag for identifying a section corresponding to the update target area and a section not corresponding to the update target area is correlated with each unit section of the map information, and
the area identification information is information in which a flag for identifying a section corresponding to the old information area and a section not corresponding to the old information area is correlated with each unit section of the map information.

7. The communication terminal according to claim 1, wherein the terminal-side map information comprises a variety of information which is necessary for route search, route guidance, and map display in addition to a road network.

8. The communication terminal according to claim 7, wherein the terminal-side map information comprises link data on roads (links), node data on nodes, intersection data on intersections, point data on points such as facilities, map display data for displaying a map, search data for searching for a route, and detection data for detecting a point.

9. A non-transitory computer-readable recording medium storing computer program, the computer program comprising:
update logic that updates terminal-side map information of a communication terminal, which is connected to a server device to communicate bidirectionally and performs movement guidance for a mobile object based on guidance information delivered from the server device, to map information of a new version for each unit section based on information acquired from the outside;
first acquiring logic that acquires area update information, the area update information is a table in which a flag for identifying a section corresponding to an update target area which is to be updated and a section not corresponding to the update target area is correlated with each unit section of map information;
second acquiring logic that acquires area identification information, the area identification information is a table in which a flag for identifying a section corresponding to an old information area in which the terminal-side map information is map information of an older version than device-side map information of the server device and a section not corresponding to the old information area is correlated with the each unit section of the map information;
request logic that requests guidance information from the server device for performing movement guidance for the mobile object based on the area update information and the area identification information; and
guide logic that performs movement guidance for the mobile object based on the guidance information delivered from the server device in response to the request,
wherein the guidance information includes matching data which is required for performing map matching of the current position of the mobile object.

10. The computer-readable recording medium according to claim 9, wherein the terminal-side map information comprises a variety of information which is necessary for route search, route guidance, and map display in addition to a road network.

11. The computer-readable recording medium according to claim 10, wherein the terminal-side map information comprises link data on roads (links), node data on nodes, intersection data on intersections, point data on points such as facilities, map display data for displaying a map, search data for searching for a route, and detection data for detecting a point.

12. A movement guidance system comprising:
a server device; and
a communication terminal that is connected to the server device to communicate bidirectionally and that performs movement guidance for a mobile object based on guidance information delivered from the server device, wherein the communication terminal includes an electronic control unit (ECU) including a processor for executing programs stored in memory, the ECU configured to:
  update terminal-side map information of the communication terminal to map information of a new version for each unit section based on information acquired from the outside,
  acquire area update information, the area update information is a table in which a flag for identifying a section corresponding to an update target area which is to be updated and a section not corresponding to the update target area is correlated with each unit section of the map information,
  acquire area identification information, the area identification information is a table in which a flag for identifying a section corresponding to an old information area in which the terminal-side map information is map information of an older version than device-side map information of the server device and a section not corresponding to the old information area is correlated with the each unit section of the map information,
  request guidance information from the server device for performing movement guidance for the mobile object based on the area update information and the area identification information, and
  perform movement guidance for the mobile object based on the guidance information delivered from the server device in response to the request from the ECU, and
  the server device configured to deliver the guidance information requested by the communication terminal to the communication terminal in response to the request for the guidance information from the communication terminal,
  wherein the guidance information includes matching data which is required for performing map matching of the current position of the mobile object.

13. The movement guidance system according to claim 12, wherein the terminal-side map information comprises a variety of information which is necessary for route search, route guidance, and map display in addition to a road network.

14. The movement guidance system according to claim 13, wherein the terminal-side map information comprises link data on roads (links), node data on nodes, intersection data on intersections, point data on points such as facilities, map display data for displaying a map, search data for searching for a route, and detection data for detecting a point.

* * * * *